US007681470B2

(12) United States Patent
Maiss

(10) Patent No.: US 7,681,470 B2
(45) Date of Patent: Mar. 23, 2010

(54) THREADED DRIVE WITH RESILIENT CATCH NUT

(75) Inventor: Harald Maiss, Schwebheim (DE)

(73) Assignee: Rexroth Star GmbH, Schweinfurt (DE)

( * ) Notice: Subject to any disclaimer, the term of this patent is extended or adjusted under 35 U.S.C. 154(b) by 1161 days.

(21) Appl. No.: 11/283,591

(22) Filed: Nov. 17, 2005

(65) Prior Publication Data
US 2006/0147291 A1 Jul. 6, 2006

(30) Foreign Application Priority Data
Nov. 25, 2004 (DE) .............. 10 2004 056 881

(51) Int. Cl.
F16H 3/06 (2006.01)
F16H 29/20 (2006.01)
F16H 1/20 (2006.01)
(52) U.S. Cl. .............. 74/89.39; 74/89.26; 74/89.23
(58) Field of Classification Search ............ 74/89.23, 74/89.26, 89.39
See application file for complete search history.

(56) References Cited

U.S. PATENT DOCUMENTS

| 2,187,390 | A | * | 1/1940 | Anderson et al. .......... 187/268 |
| 4,279,329 | A | | 7/1981 | Gehron |
| 5,467,661 | A | * | 11/1995 | Lange ..................... 74/441 |
| 2002/0104394 | A1 | * | 8/2002 | Manzanares et al. ....... 74/89.26 |
| 2005/0132831 | A1 | | 6/2005 | Scholz |

FOREIGN PATENT DOCUMENTS

| DE | 1 941 814 | 2/1971 |
| DE | 29 06 172 | 8/1980 |
| DE | 196 25 999 | 1/1998 |
| DE | 203 18 234 | 3/2004 |
| DE | 103 48 320 | 5/2005 |

* cited by examiner

Primary Examiner—Thomas R Hannon
Assistant Examiner—Justin Krause
(74) Attorney, Agent, or Firm—Michael J. Striker

(57) ABSTRACT

In a threaded drive having a load-bearing nut and a catch nut, for securing against a load-bearing nut, the catch nut is urged by a spring against an axial bearing face of the load-bearing nut.

11 Claims, 1 Drawing Sheet

THREADED DRIVE WITH RESILIENT CATCH NUT

BACKGROUND OF THE INVENTION

The invention relates to a threaded drive with a load-bearing nut and a catch nut.

A threaded drive of this kind is known, for instance from German Patent Disclosure DE 103 48 320. FIG. 2 of this reference shows a threaded drive 110 with an axis A, comprising a load-bearing nut and a catch nut 116. The load-bearing nut comprises a main body 114 and a securing body 118. The load-bearing nut and the catch nut are in screwing engagement with the threaded spindle 112, and the catch nut has a greater thread play than the load-bearing nut. This assures that the flow of force can be effected via the load-bearing nut in a first operating state and via the catch nut in a second operating state.

The catch nut can be fixed in a position in which it rests on a bearing face of the load-bearing nut and in which it does not touch the threaded spindle and in particular its thread courses. The first operating state corresponds to the normal operating mode of the threaded drive, in which the load-bearing nut is functioning properly, while in the second operating state, damage has occurred to the load-bearing nut. With the catch nut, the intent is then to prevent a load, which would be lifted by the threaded drive counter to gravity, from dropping.

From German Utility Model DE-GM 19 41 814, a similar threaded drive is known, in which the catch nut is also freely rotatable to the load-bearing nut during operation, particularly in the second operating state. This is intended to assure that damage to the load-bearing nut can be recognized from someone outside from the fact that motion of the threaded drive is not possible, or is now possible only in one direction. An axial mobility of the catch nut relative to the load-bearing nut is also provided.

A disadvantage of this embodiment is that no precautions were taken to prevent the load-bearing nut from touching the threaded spindle. That is especially important whenever a roller body revolution nut is used as the load-bearing nut. In that case, the thread courses of the threaded spindle have a high surface quality, which could be easily destroyed by a catch nut scraping it. The durability of the threaded drive would be impaired as a result.

From German Patent DE 196 25 999 C2, a further threaded drive with a catch nut is known. Here, the catch nut is joined to the load-bearing nut in a manner fixed against relative rotation via a thin web. If the load-bearing nut fails, the web is deformed elastically or plastically in the axial direction, so that an axial motion of the catch nut relative to the load-bearing nut ensues. This motion is detected by a safety switch.

A disadvantage of this embodiment is that the connection between the catch nut and the load-bearing nut can be manufactured and installed only at great effort and expense. For that purpose, the load-bearing nut can be embodied integrally with the catch nut, but this can be accomplished only with difficulty if a hardened roller body revolution nut is employed. If the load-bearing nut and catch nut are embodied separately, on the other hand, a complicated alignment procedure is required to assure that the catch nut will not touch the thread courses of the threaded spindle.

SUMMARY OF THE INVENTION

It is therefore an object of the present invention to provide a threaded drive with a load-bearing nut and a catch nut, for securing against failures of the load-bearing nut, which is a further improvement of the existing threaded drives.

It is another object of the invention to create a threaded drive in which the failure of the catch nut can be recognized from someone outside.

This object is attained in that the catch nut is urged by a spring against the bearing face. This reduces the rotation resistance between the catch nut and the load-bearing nut. If the catch nut fails, this rotation resistance no longer suffices to hold the load-bearing nut firmly against the friction torque of the driven threaded spindle, and thus no further axial motion occurs. This situation is easily recognized by someone outside.

Compared to the embodiment of DE 103 48 320, the threaded drive of the invention is especially advantageous because the only additional part needed is a spring that can be inexpensively procured on the market.

Aligning the catch nut can moreover be simplified still further if the catch nut is freely rotatable relative to the load-bearing nut. Because of the limited rotation resistance, the catch nut can be rotated for alignment purposes, namely for adjusting the gap between the catch nut and the threaded spindle, without having to loosen securing screws and tighten them again.

The catch nut can be secured against rotation relative to the load-bearing nut in the first position by means of friction locking on the bearing face. This assures that the gap between the threaded spindle and the catch nut is continuously variably adjustable. By way of the design of the touching surfaces, for instance the design of the surface roughness and the surface coating, the desired frictional force can be adjusted. Optionally, a shim of suitable frictional material may also be provided.

In the first operating state, in which the catch nut is in the first position, the rotation resistance can be greater than in the second operating state. In the first operating state, the rotation resistance must be so greater that the catch nut does not rotate relative to the load-bearing nut even if vibration occurs. In the second operating state, however, the catch nut should be relatively easily rotated.

It is advantageous if in the second operating state, a free rotation of the catch nut relative to the load-bearing nut is possible in only one direction, while in the other direction a slaved connection is provided, so that the load being conveyed can still be conveyed to a safe position. This effect can be achieved by means of a design of the threaded drive in accordance with DE-GM 19 41 814, which is hereby incorporated to its full extent by reference. The safe position may be either a fully raised or a fully lowered position of an external load. In this embodiment, by means of the spring of the invention, a more-reliable function can be achieved than in the embodiment according to DE-GM 19 41 814.

For safe function, it is decisive that a greater rotation resistance exists between the catch nut and the threaded drive than between the catch nut and the load-bearing nut in the freely rotatable direction. By means of the spring, however, this latter rotation resistance can be reduced purposefully, since the applicable frictional faces are relieved by the spring force. Between the spring and the load-bearing nut, or the catch nut, an axial ball bearing is advantageously also provided, for minimizing the friction between the spring and the load-bearing nut or the catch nut.

The catch nut may be embodied axially movably relative to the load-bearing nut, so that the failure of the load-bearing nut can already be recognized by someone outside from a slight jerking motion of the load. The direction of the axial mobility must therefore be selected such that the load-bearing nut can move toward the catch nut in the direction of gravity. Because of the axial mobility, installing the spring is also simpler, since no additional stops have to be provided that limit the compression travel of the spring upon engagement of the catch nut. The spring, which is preferably embodied as a cup spring or cup spring assembly, can instead simply be compressed to a block.

The axial travel of the catch nut can be detected by a switch device. The switch device is preferably embodied as an inductive proximity switch, which is secured to the load-bearing nut. The switch device signal can be carried on to the controller of a higher-ranking system or machine, which in turn initiates an appropriate emergency procedure.

In closing, it should also be pointed out that the screwing engagement between the catch nut and the threaded spindle is advantageously self-inhibiting, so that an external load in the second operating state cannot by its own weight already cause the catch nut to rotate. Otherwise, the load would automatically move downward.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
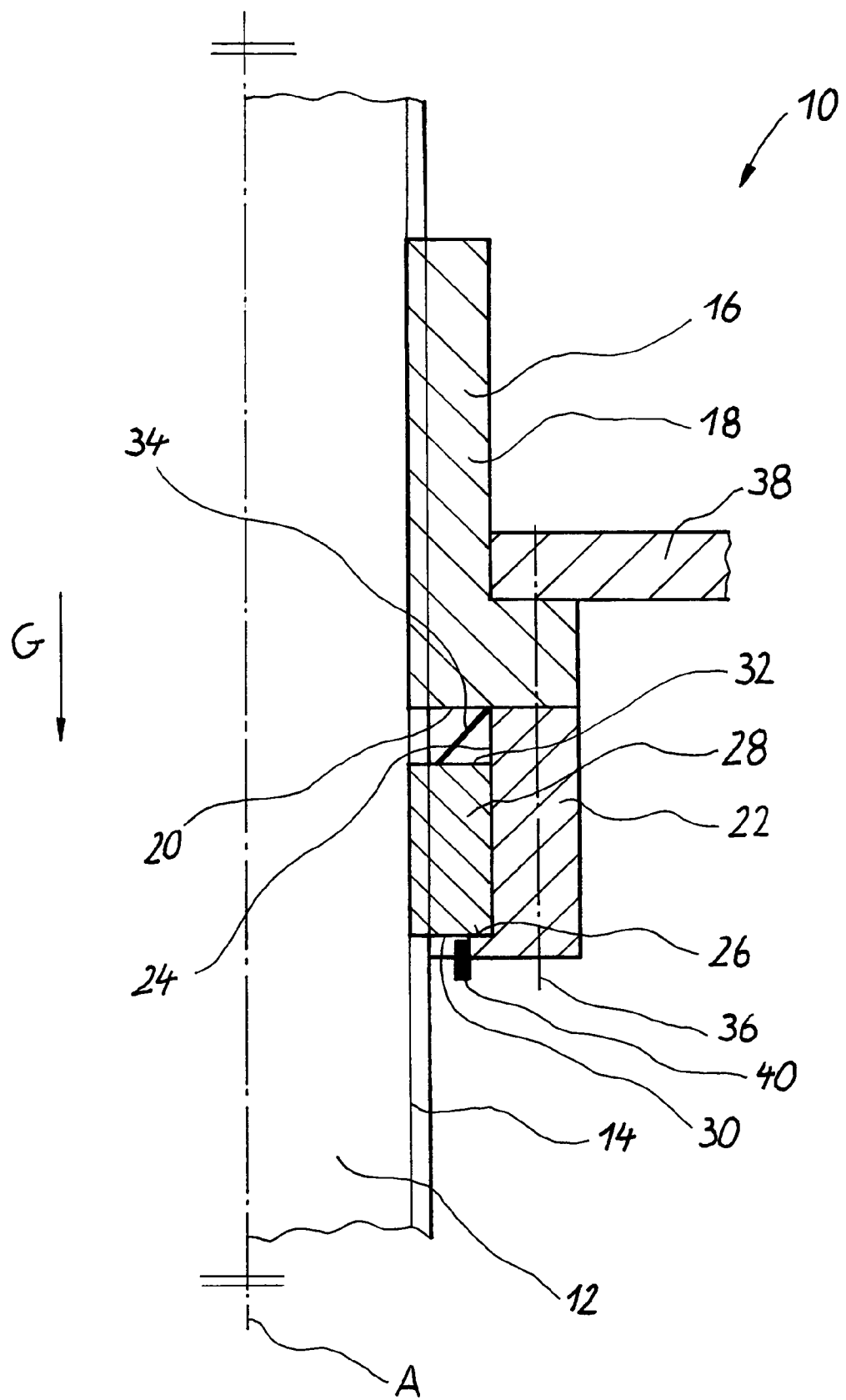
FIG. 1 is a schematic sectional view of a threaded drive according to the invention.

FIG. 1 shows a threaded drive according to the invention, identified overall by reference numeral 10, and its axis A. The threaded drive comprises a threaded spindle 12 with thread courses 14 shown in simplified form. The threaded drive 10 further includes a load-bearing nut 16 and a catch nut 28, which are in screwing engagement with the threaded spindle 12. The load-bearing nut 16 comprises a main body 18, which is embodied as a ball revolution nut, and a securing body 22.

The inner circumferential surface 24 of the securing body 22 is circular-cylindrical and serves to guide the catch nut 28 in the axial direction. The securing body 22 is secured by screw bolts 36, shown in simplified form, to the main body 18, which in turn is secured to a higher-ranking structural unit 38. The higher-ranking structural unit represents an external load, which the threaded drive is meant to carry or raise or lower counter to the direction of gravity G.

On the securing body 22, a bearing face 26 is also provided, which extends transversely to the axis A. In the first operating state of the threaded drive, in which the load-bearing nut 16 is functioning properly, the catch nut 28 rests with a first end face 30 on the bearing face 26, and it is urged against the bearing face 26 by a cup spring assembly 34 shown in simplified form. The cup spring assembly is installed with prestressing between an end face 20 of the main body 18 and a second end face 32 of the catch nut.

The maximum stroke length of the cup spring assembly 34 is precisely great enough that an inductive proximity switch 40, which is mounted on the securing body 22 and aligned with the first end face 30 of the catch nut 28, will respond reliably at the transition from the first operating state to the second operating state. In the second operating state, because of a technical defect or an overload, the load-bearing nut has failed, so that the weight of the external load can no longer be transmitted to the threaded spindle 12.

This will now cause the weight to be introduced from the main body 18 of the load-bearing nut 16 into the threaded spindle 12 via the cup spring assembly 34 and the catch nut 28. The cup spring assembly 34 is compressed to a block here, and as a result, the catch nut 28 is displaced axially relative to the load-bearing nut 16, which in turn can be detected by the inductive proximity switch 40.

Two axial bores, not shown, are made on the first end face 30 of the catch nut 28 and serve the purpose of allowing a face wrench to engage them. The catch nut 28 can thus be aligned relative to the threaded spindle 12 such that it does not touch the threaded spindle. With the face wrench, the friction torque that is generated between the first end face 30 of the catch nut 28 and the bearing face 26 of the load-bearing nut 16 must be overcome.

Care must be taken to assure that the thread courses of the catch nut are embodied equidistantly from the thread courses 14 of the threaded spindle 12, the spacing being approximately 0.3 mm. The pitch of the threaded drive is selected to be so slight that in the second operating state, self-inhibition exists between the threaded spindle 12 and the catch nut 28.

It will be understood that each of the elements described above, or two or more together, may also find a useful application in other types of constructions differing from the types described above.

While the invention has been illustrated and described as embodied in a threaded drive with resilient catch nut, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A threaded drive, comprising a threaded spindle having an axis; a load-bearing nut and a catch nut which are in screwing engagement with said threaded spindle, such that a force flux takes place via said load-bearing nut in a first operating state and via said catch nut in a second operating state, said catch nut being fixable relative to said load-bearing nut in a first position in which said catch nut is braceable in an axial direction on a bearing face of said load-bearing nut, which extends transversely to said axis, and said catch nut does not touch thread courses of said threaded spindle; and a spring by which said catch nut is urged against said bearing face, wherein said load-bearing nut and said catch nut are configured so that in said second operating state, a free rotation of said catch nut relative to said load-bearing nut is possible in only one direction, while in another direction a slaved connection is provided.

2. A threaded drive as defined in claim 1, wherein said catch nut is configured such that said catch nut rotates freely with respect to said load-bearing nut when the catch nut is in the first position.

3. A threaded drive as defined in claim 1, wherein said catch nut is secured in said first position against rotation relative to said load-bearing nut by friction locking on said bearing face.

4. A threaded drive as defined in claim 1, wherein said catch nut is configured so that a rotation resistance in said first operating, in which said catch nut is in said first position, is greater than in said second operating stage.

5. A threaded drive as defined in claim 1 wherein said catch nut is configured so that it is axially movable relative to said load-bearing nut.

6. A threaded drive as defined in claim 5; and further comprising a switch device for detecting an axial movement of said catch nut.

7. A threaded drive as defined in claim 6, wherein said switch device for detecting the axial movement of said catch nut is formed as an inductive proximity switch.

8. A threaded drive as defined in claim 1, wherein said load-bearing nut is configured as a rolling-body circulation nut.

9. A threaded drive as defined in claim 1, wherein said spring is configured as a cup spring.

10. A threaded drive as defined in claim 1, wherein said spring is configured as a cup spring assembly.

11. A threaded drive as defined in claim 1, wherein said catch nut and said threaded spindle are configured so that the screwing engagement between said catching nut and said threaded spindle is self-inhibiting.

\* \* \* \* \*